United States Patent
Kim

(10) Patent No.: US 8,678,488 B1
(45) Date of Patent: Mar. 25, 2014

(54) ROLL BLIND SYSTEM FOR PANORAMA SUN ROOF OF VEHICLE

(71) Applicant: Hyundai Motor Company, Seoul (KR)

(72) Inventor: Do Won Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/710,201

(22) Filed: Dec. 10, 2012

(30) Foreign Application Priority Data

Oct. 30, 2012 (KR) .................. 10-2012-0121641

(51) Int. Cl.
*B60J 3/02* (2006.01)
*B60J 7/00* (2006.01)

(52) U.S. Cl.
USPC ................ 296/214; 160/120; 160/370.22

(58) Field of Classification Search
USPC ........... 296/214, 219; 160/25, 120, 133, 309, 160/370.22
See application file for complete search history.

(56) References Cited

U.S. PATENT DOCUMENTS

| 6,682,133 B2 * | 1/2004 | Glasl ................. 296/216.01 |
| 7,469,960 B2 * | 12/2008 | Koelbl et al. ............. 296/214 |
| 8,511,735 B2 * | 8/2013 | Lee ..................... 296/97.4 |
| 2007/0221339 A1 | 9/2007 | Elbs et al. |

FOREIGN PATENT DOCUMENTS

| JP | 2009-280159 A | 12/2009 |
| KR | 10-2011-0045555 A | 5/2011 |
| KR | 10-2011-0099612 A | 9/2011 |
| KR | 10-2012-0062955 A | 6/2012 |

* cited by examiner

*Primary Examiner* — Dennis Pedder
(74) *Attorney, Agent, or Firm* — Morgan, Lewis & Bockius LLP

(57) ABSTRACT

A roll blind system for a panorama sun roof of a vehicle opens front and rear roll blinds independently by dividing the panorama sun roof into two parts. The roll blind system includes: front and rear roll blinds disposed between right and left guide rails, disposed in front of and behind of the panorama sun roof and includes front and rear blind bars disposed on opposite ends of the and rear roll blinds; one cable engaged with a motor gear; a front shoe attached to a left end of the front blind bar and movable via the cable and a second cable end; a rear shoe attached to a right end of the rear blind bar and being movable via the cable and third and fourth cable ends; and a return spring connected to a front blind shaft extendable when the front blind bar is moved in the forward direction.

5 Claims, 8 Drawing Sheets

ROLL BLIND SYSTEM FOR PANORAMA SUN ROOF OF VEHICLE

CROSS-REFERENCE TO RELATED PATENT APPLICATION

The present application claims priority of Korean Patent Application Number 10-2012-0121641 filed Oct. 30, 2012, the entire contents of which application is incorporated herein for all purposes by this reference.

BACKGROUND OF INVENTION

1. Field of Invention

The present invention relates to a roll blind system for a panorama sun roof of a vehicle, and more particularly, to a roll blind system for a panorama sun roof of a vehicle that may open or close front and rear roll blinds independently by dividing the panorama sun roof installed at a roof of the vehicle into two parts.

2. Description of Related Art

In general, installation of sun roofs is recently increasing as units for interior ventilation and for obtaining an open feeling.

Sun roofs usually operate in a full open state or in a partially open state in which only a rear portion of a sun roof can be slightly lifted for the purpose of air circulation in a non-full open state.

Also, panorama sun roofs that provide a feeling of a convertible by maximizing an open feeling by manufacturing the greater part of a roof panel by using glass in addition to a front part of the vehicle have recently enjoyed popularity.

That is, panorama sun roofs have a structure in which the greater area of the roof panel of the vehicle is open and the entire roof is covered with glass, and when glass is open, the entire roof is open so that a feeling of cool traveling can be obtained.

A driving unit of the panorama sun roof according to the related art is divided into a roll blind part and a glass part. A motor is required to operate the roll blind part and the glass part, and in particular, the roll blind is divided into a front roll blind and a rear roll blind, and two motors are required to operate each of the front roll blind and the rear roll blind. Thus, three motors altogether are required for the panorama sun roof according to the related art.

A panorama driving unit that opens or closes a front roll blind and a rear roll blind to operate the front roll blind and the rear roll blind simultaneously by using only one motor in consideration of this disadvantage has been recently suggested.

For example, as illustrated in FIG. 5, a front roll blind 1 and a rear roll blind 2 are disposed in front of and in rear of the panorama sun roof, and the front roll blind 1 and the rear roll blind 2 are connected to a gear 5 of a motor via cables 3 and 4.

In this case, one cable 3 is connected between one side of the front roll blind 1 and one side of the rear roll blind 2, and the other one cable 4 is connected between the other side of the front roll blind 1 and the other side of the rear roll blind 2.

In a method of driving the roll blind for the panorama sun roof of the vehicle according to the related art, the front roll blind 1 and the rear roll blind 2 are simultaneously driven by using one motor. Thus, when the motor is rotated, each cable operates in an opposite direction so that the front roll blind and the rear roll blind operate simultaneously and are simultaneously open or closed.

However, in the method of driving the roll blind for the panorama sun roof according to the related art as described above, the front and rear roll blinds 1 and 2 operate simultaneously and thus can be only simultaneously open or closed.

For example, when a roll blind of a front seat passenger compartment is open, the rear roll blind 2 is open simultaneously with the front roll blind 1 such that a rear seat passenger who dislikes sunshine, may have a feeling of displeasure. Thus, improvements for this are required.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a roll blind system for a panorama sun roof of a vehicle that may implement various open and/or closed modes, such as a front open mode, a full open mode, a rear open mode, and a full closed mode, sequentially by connecting one motor to a cable so as to operate front and rear roll blinds of the panorama sun roof separately.

According to various aspects of the present invention, there is provided a roll blind system for a panorama sun roof of a vehicle, the roll blind system including: a front roll blind and a rear roll blind that are disposed between right and left guide rails, are disposed in front of and in rear of the panorama sun roof to be open or closed and includes a front blind bar and a rear blind bar disposed on opposite ends of the front roll blind and the rear roll blind; one cable engaged with a motor gear and being movable in forward and backward directions by using a motor; a front shoe attached to a left end of the front blind bar and being movable in the backward direction via the cable and a second cable end; a rear shoe attached to a right end of the rear blind bar and being movable in forward and backward directions via the cable and third and fourth cable ends; and a return spring connected to a front blind shaft to be extendable when the front blind bar is moved in the forward direction.

A first stopper and a second stopper may be disposed on a front end and a middle part of one side guide rail, and a third stopper and a fourth stopper may be disposed on a rear end and a middle part of the other side guide rail.

The front shoe may include a protrusion by which the second cable end moved in the forward direction together with the cable, is caught.

The cable may include: a first cable end disposed in front of the front shoe; a fourth cable end disposed in front of the rear shoe; and a second cable end and a third cable end, each spaced apart from the first cable end and the fourth cable end by a predetermined distance and being movable together with the cable by using a motor.

A front carrier may be disposed in front of the second cable end in a state where the front shoe is interposed between the front carrier and the second cable end, and a rear carrier may be disposed in front of the third cable end in a state where the rear shoe is interposed between the rear carrier and the third cable end.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
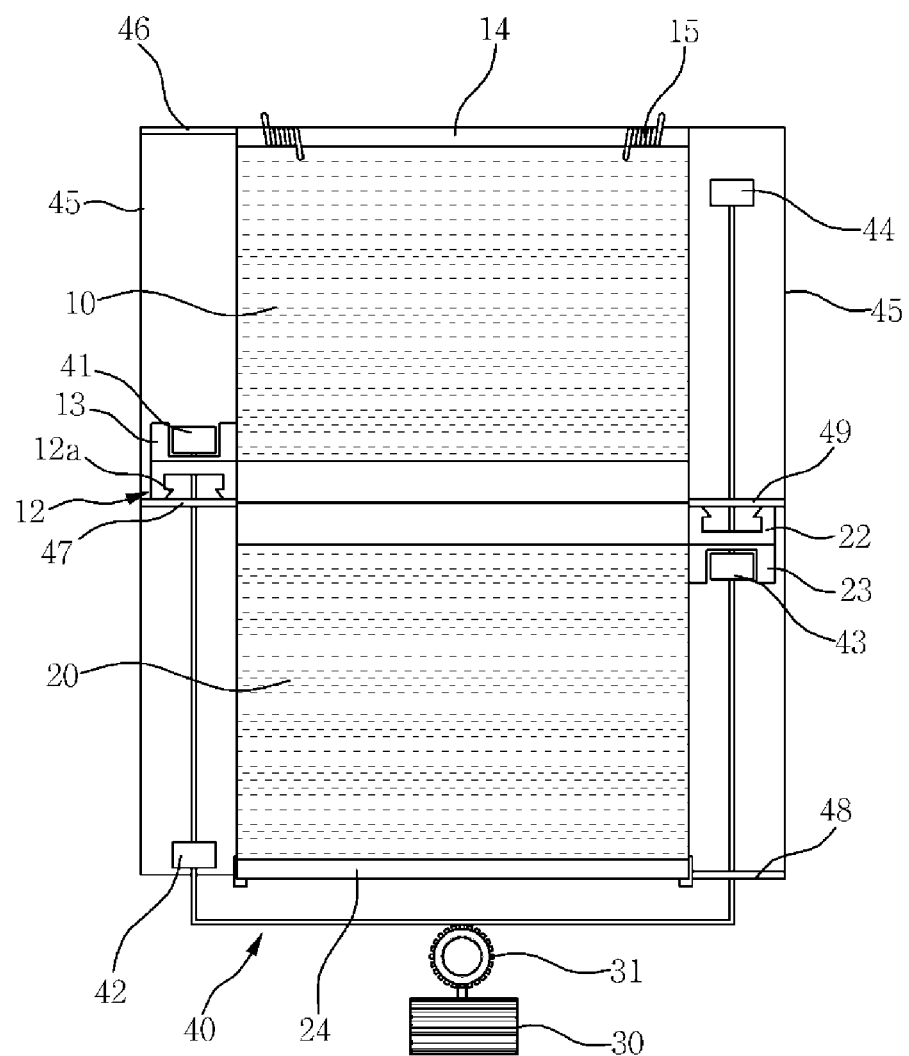
FIG. 1 is a schematic view illustrating an exemplary roll blind system for a panorama sun roof of a vehicle according to the present invention.
Figure 2:
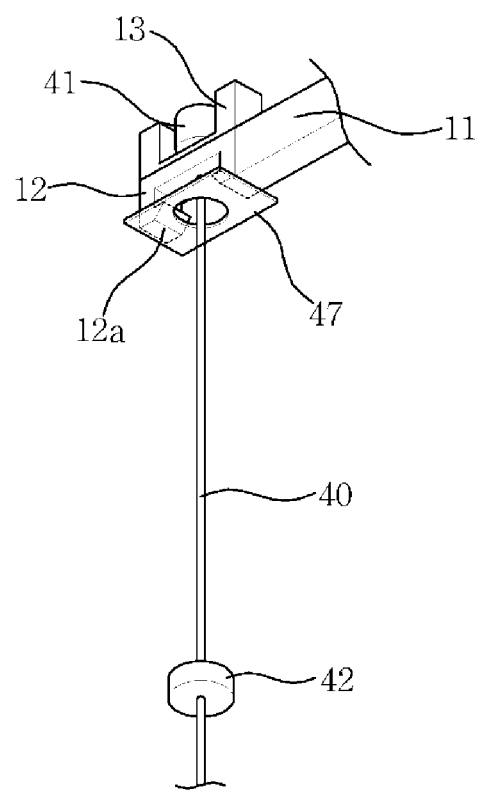
FIGS. 2 and 3 are perspective views illustrating a partial structure of the roll blind system illustrated in FIG. 1.
Figure 3:
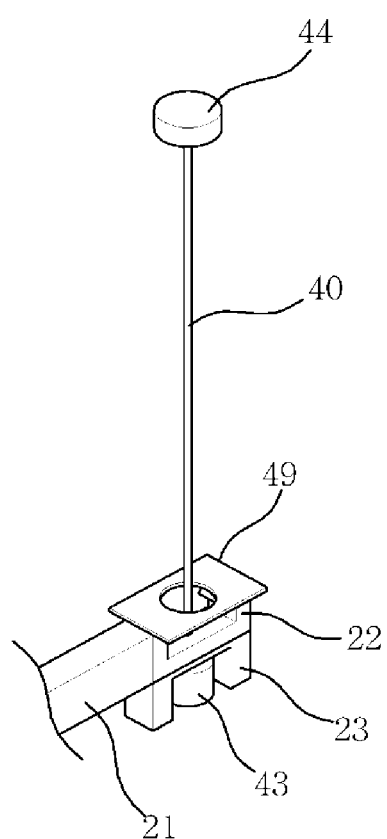

FIG. 1 is a schematic view illustrating a roll blind system for a panorama sun roof of a vehicle according to various embodiments of the present invention, and FIGS. 2 and 3 are perspective views illustrating a partial structure of the roll blind system illustrated in FIG. 1.

As illustrated in FIG. 1, the roll blind system for the panorama sun roof according to various embodiments includes a roll blind including a front roll blind 10 and a rear roll blind 20 that are open or closed by dividing the entire area of the panorama sun roof into two parts, a motor 30 as a driving source for independently operating the front and rear roll blinds 10 and 20, a motor gear 31 that is rotated by the motor 30, and one cable 40 that is engaged with the motor gear 31 so as to be moveable by using the motor 30.

The cable 40 is used in blind operating the front and rear roll blinds 10 and 10 and includes a first cable end 41, a second cable end 42, a third cable end 43, and a fourth cable end 44 that are disposed in predetermined positions of the cable 40, so as to operate the front roll blind 10 and the rear roll blind 20 separately. The first cable end 41 is attached to one end (that is close to a front shoe 12) of the cable 40, and the fourth cable end 44 is attached to the other end (that is close to a rear shoe 22) of the cable 40.

The second and third cable ends 42 and 43 are attached to a middle part of the cable 40. The second cable end 42 is spaced apart from the first cable end 41 by a predetermined distance, and the third cable end 43 is spaced apart from the fourth cable end 44 by a predetermined distance and is also spaced apart from the second cable end 42 by a predetermined distance.

In order to operate the front roll blind 10 and the rear roll blind 20 separately, the front shoe 12 and the rear shoe 22 are mounted on a front blind bar 11 and a rear blind bar 21.

The front blind bar 11 and the rear blind bar 21 are disposed on opposite ends of the front roll blind 10 and the rear roll blind 20 and are connected to right and left guide rails 45 to be movable in a forward or backward direction by operating the cable 40 via the motor gear 31. The front and rear shoes 12 and 22 are attached to a left end of the front blind bar 11 and to a right end of the rear blind bar 21.

As illustrated in FIGS. 1 through 3, a front carrier 13 is adjacent to a front end of the front shoe 12, and a rear carrier 23 is adjacent to a rear end of the rear shoe 22.

A hole (cable movement hole) through which the moving cable 40 may pass, is formed in each of the shoes 12 and 22 and the carriers 13 and 23. The cable movement hole has a size at which the first through fourth cable ends 41 to 44 may not pass through.

The first cable end 41 is disposed in front of the front carrier 13 disposed in front of the front shoe 12 and is located opposite to the front shoe 12 in a state where the front carrier 13 is interposed between the first cable end 41 and the front shoe 12, and the second cable end 42 is disposed in rear of the front shoe 12 and is located opposite to the front carrier 13 in a state where the front shoe 12 is interposed between the second cable end 42 and the front carrier 13.

In addition, the third cable end 43 is disposed in rear of the rear carrier 23 disposed in rear of the rear shoe 22 and is located opposite to the rear shoe 22 in a state where the rear carrier 23 is interposed between the third cable end 43 and the rear shoe 22, and the fourth cable end 44 is disposed in front of the rear shoe 22 and is located opposite to the rear carrier 23 in a state where the rear shoe 22 is interposed between the fourth cable end 44 and the rear carrier 23.

Thus, when the motor 30 operates, the motor gear 31 connected to a motor shaft is rotated, and the cable 40 is moved due to contact electric power (power supplied by contact) with the motor gear 31 rotated in this way, and the shoes 12 and 22 and the carriers 13 and 23 are moved via the cable ends 41 to 44 so that the front and rear blind bars 11 and 21 and the front and rear roll blinds 10 and 20 may operate separately.

In this case, a front open mode in which only the front roll blind 10 is open, is implemented by a return spring 15 connected to a blind shaft 14. The return spring 15 is extended when the front roll blind 10 is closed, and when regulation by the motor 30 and the cable 40 is released, the return spring 15 allows the front roll blind 10 to operate in the front open mode and to open the front roll blind 10 due to a restoring force.

Also, a structure for detaching the second cable end 42 from the cable 40 is disposed at the front shoe 12. As illustrated in FIGS. 1 and 2, a protrusion 12a is formed from a rear end of the front shoe 12 so that the second cable end 42 may be caught by the protrusion 12a, and the second cable end 42 may be attached to the front shoe 12 via the protrusion 12a when the second cable end 42 is moved together with the cable 40 due to contact electric power with the motor gear 31.

In detail, the second cable end 42 is moved in a forward direction by movement of the cable 40 and is pulled out toward the front shoe 12 and is engaged with an inside of the front shoe 12 due to the protrusion 12a or is moved in a backward direction by movement of the cable 40 and is pulled out toward an outside of the front shoe 12 and escapes from the protrusion 12a and is detached from the front shoe 12.

In addition, first through fourth stoppers 46 to 49 are disposed in predetermined positions of the right and left guide rails 45 so as to regulate forward and/or backward movement of the carriers 13 and 23 and the shoes 12 and 22. The first stopper 46 is disposed on a front end of the left guide rail 45 so as to prevent forward movement of the front carrier 13 in an open state (front open mode) of the front roll blind 10 due to the return spring 15, and the second stopper 47 is disposed in the middle part of the left guide rail 45 so as to prevent backward movement of the front shoe 12 that allows the front blind bar 11 to be moved in the backward direction in the rear open mode, and the third stopper 48 is disposed on a rear end of the right guide rail 45 so as to prevent backward movement of the rear carrier 23 that allows the rear blind bar 21 to be moved in the backward direction in the full open mode, and the fourth stopper 49 is disposed in the middle part of the right guide rail 45 so as to prevent forward movement of the rear shoe 22 that allows the rear blind bar 21 to be moved in the forward direction in the full closed mode.

Here, a hole (cable movement hole) through which the cable ends 41 to 44 in addition to the cable 40 may pass, is formed in each of the stoppers 46 to 49.

Furthermore, elements for independent opening of the roll blinds 10 and 20, such as the cable 40, the carriers 13 and 23, the shoes 12 and 22, and the cable ends 41 to 44, are supported by the right and left guide rails 45 and are movable and operable.

In the roll blind system for the panorama sun roof of the vehicle having the above structure, the front open mode, the full open mode, the rear open mode, and the full closed mode are sequentially implemented by using one motor 30 and one cable 40, and an operational state of the roll blind system will now be described below.

FIGS. 4A through 4D illustrates the operational state of the roll blind system for the panorama sun roof of the vehicle of FIG. 1

First, in an initial full closed mode illustrated in FIG. 1, the restoring force of the extended return spring 15 acts on the front blind bar 11; however, movement of the cable 40 by using the motor 30 does not occur so that movement of the front blind bar 11 is regulated by the front carrier 13 and the front shoe 12 and the front blind bar 11 is not open and is maintained in the full closed state.

Figure 4A:
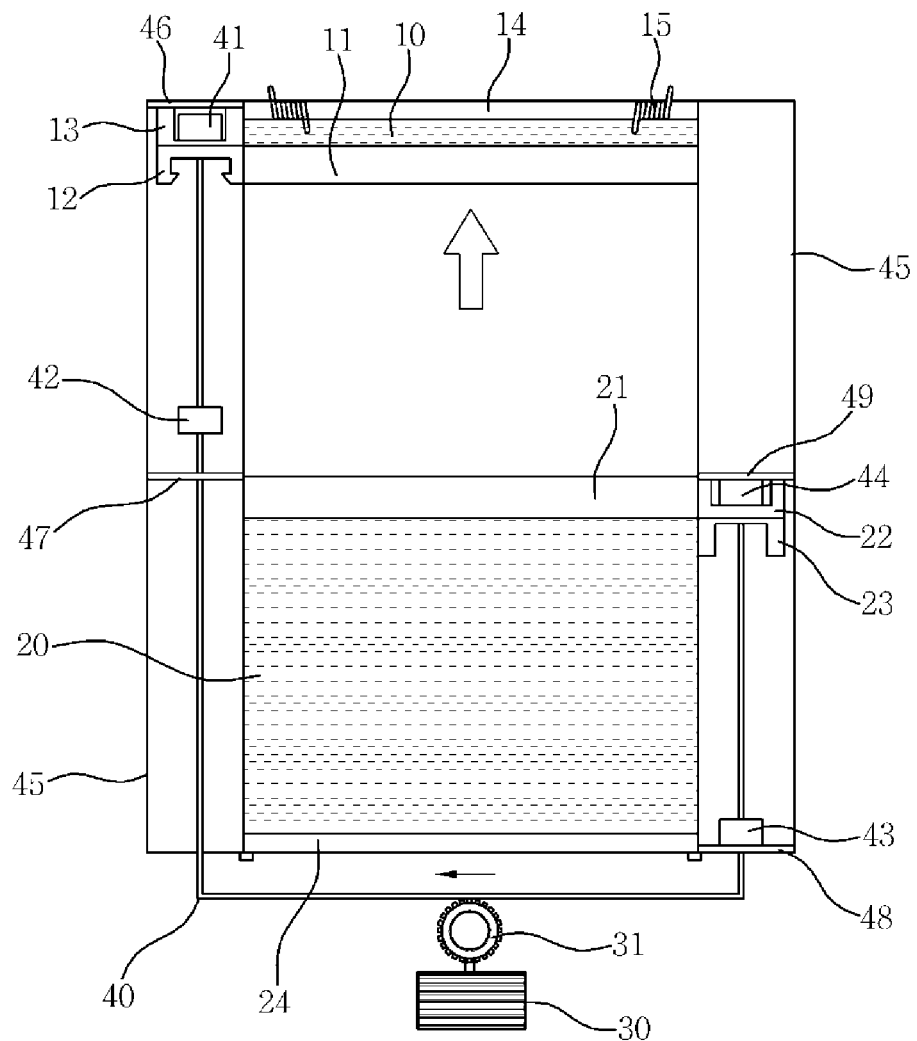
FIG. 4A illustrates an operational state of the roll blind system of FIG. 1 in a front open mode.

Next, as illustrated in FIG. 4A, in the front open mode, as the motor 30 operates and the cable 40 is moved in the forward direction (clockwise based on FIG. 4B) due to contact electric power of the motor gear 31, regulation of the return spring 15 is released, and the front blind bar 11 is moved in the forward direction due to the restoring force of the return spring 15 so that the front roll blind 10 may be open.

In this case, as the first cable end 41 that regulates the restoring force of the return spring 15, is moved in the forward direction together with the cable 40, the front carrier 13 is movable in the forward direction, and due to the restoring force of the return spring 15, the front carrier 13 is moved in the forward direction while being pushed by the front shoe 12 that is moved in the forward direction together with the front blind bar 11.

Thus, the restoring force of the return spring 15 regulated by the front shoe 12 via the first cable end 41, acts on the front blind bar 11 so that the front blind bar 11 may be pulled out due to the restoring force and thus the front roll blind 10 may be open.

Also, in this case, the third and fourth cable ends 43 and 44 are moved in the backward direction together with the cable 40.

Figure 4B:
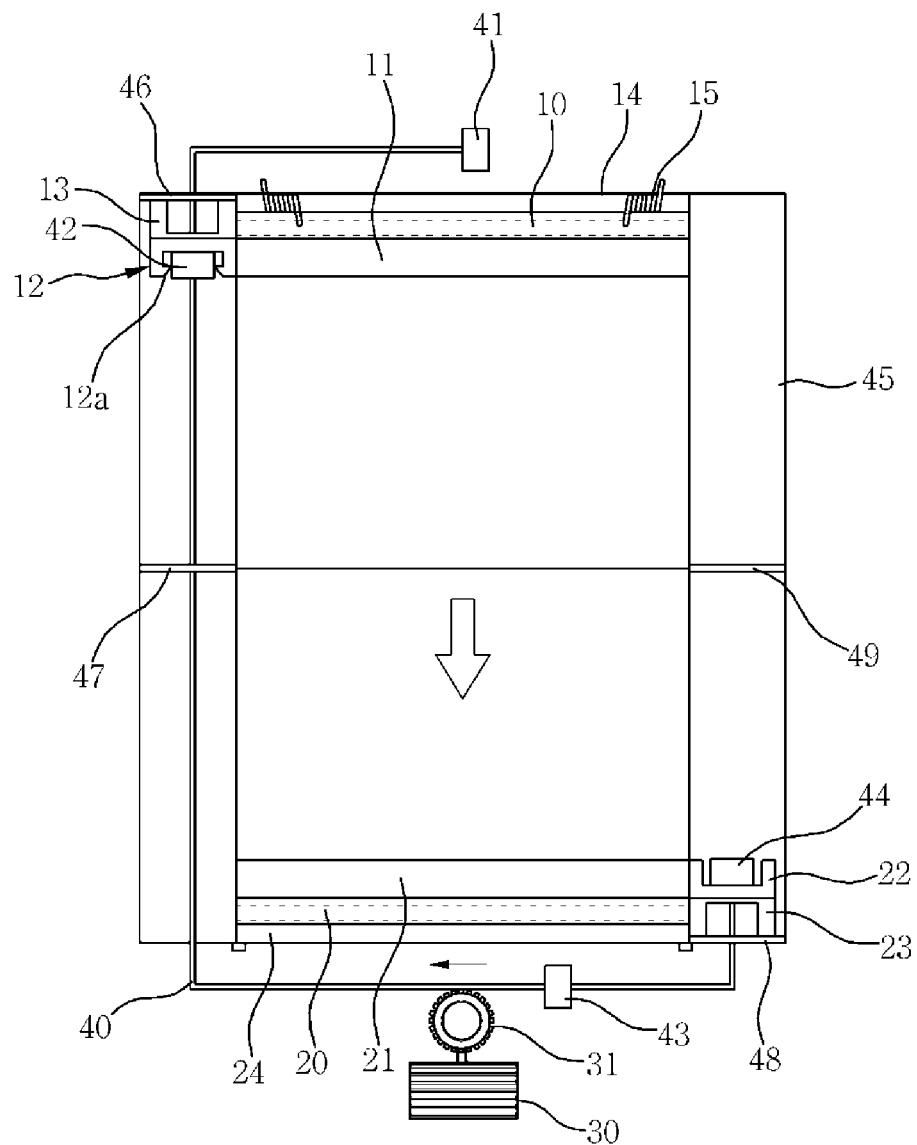
FIG. 4B illustrates an operational state of the roll blind system of FIG. 1 in a full open mode.

Next, as illustrated in FIG. 4B, in the full open mode, the cable 40 is further moved by the motor 30 in the forward direction. In detail, the front carrier 13 that reaches the front end of the left guide rail 45 is blocked by the first stopper 46 and may not be moved and is stopped, and the second cable end 43 is combined with the front shoe 12 via the protrusion 12a and forms a couple with the front shoe 12, and the first cable end 41 is further moved by the motor 30 and the cable 40 in the forward direction and is detached from the front carrier 13.

In this case, the fourth cable end 44 pulls the rear shoe 22 and is moved in the backward direction (backward movement) and simultaneously allows the rear blind bar 21 connected to the rear shoe 22 and the read roll blind 20 to be open.

Figure 4C:
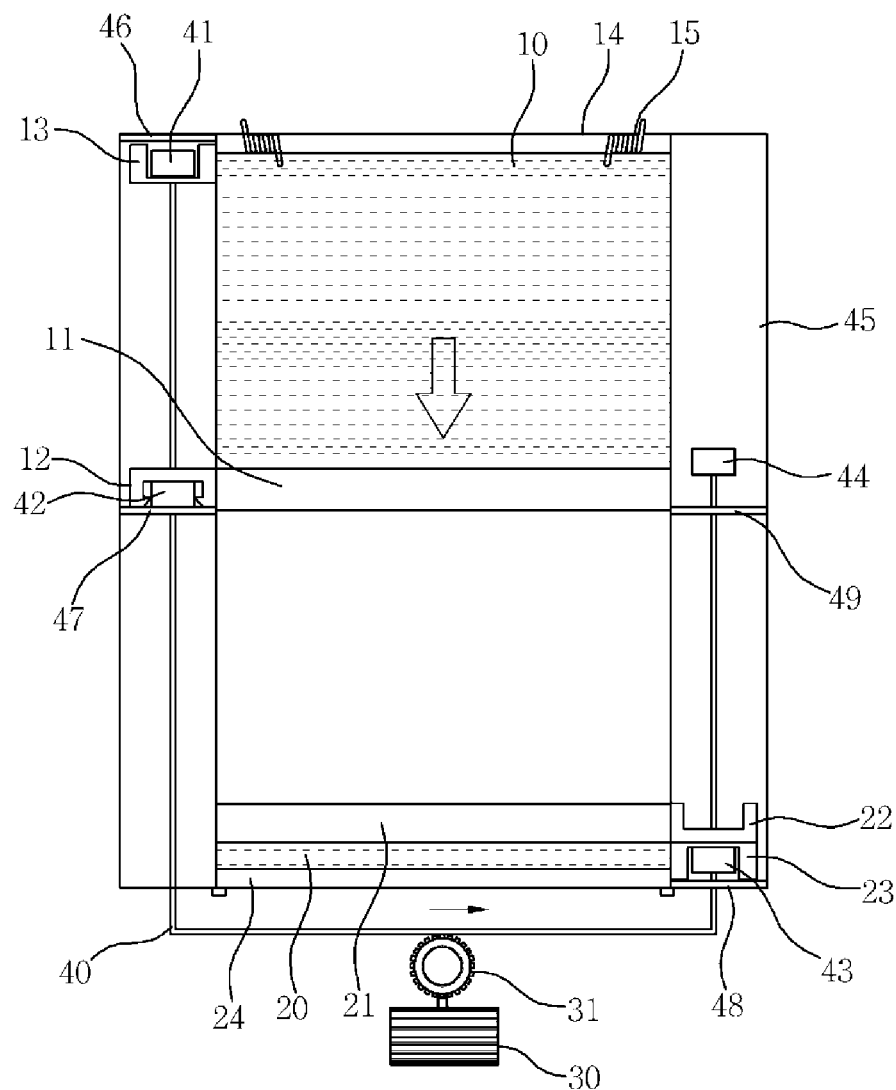
FIG. 4C illustrates an operational state of the roll blind system of FIG. 1 in a rear open mode.

Subsequently, as illustrated in FIG. 4C, when a front closed signal (or rear open mode signal) is input to the roll blind system and the direction of the motor 30 is converted into an opposite direction and the rotation direction of the motor gear 31 is changed, the cable 40 pulls the front shoe 12 via the second cable end 42 combined with the front shoe 12 and allows the front blind bar 11 to be moved in the backward direction and the front roll blind 10 to be closed (front closed or rear open mode).

In this case, the second cable end 42 withstands (overcomes) a spring force of the return spring 15, is moved in the backward direction together with the front blind bar 11 and allows the front roll blind 10 to be closed, and further movement of the front shoe 12 that is moved in the backward direction together with the second cable end 42, is blocked by the second stopper 47.

Also, in this case, the first cable end 41 is moved in the backward direction and reaches the front carrier 13, and the third and fourth cable ends 43 and 44 are moved in the forward direction, and the third cable end 43 reaches the rear carrier 23.

Figure 4D:
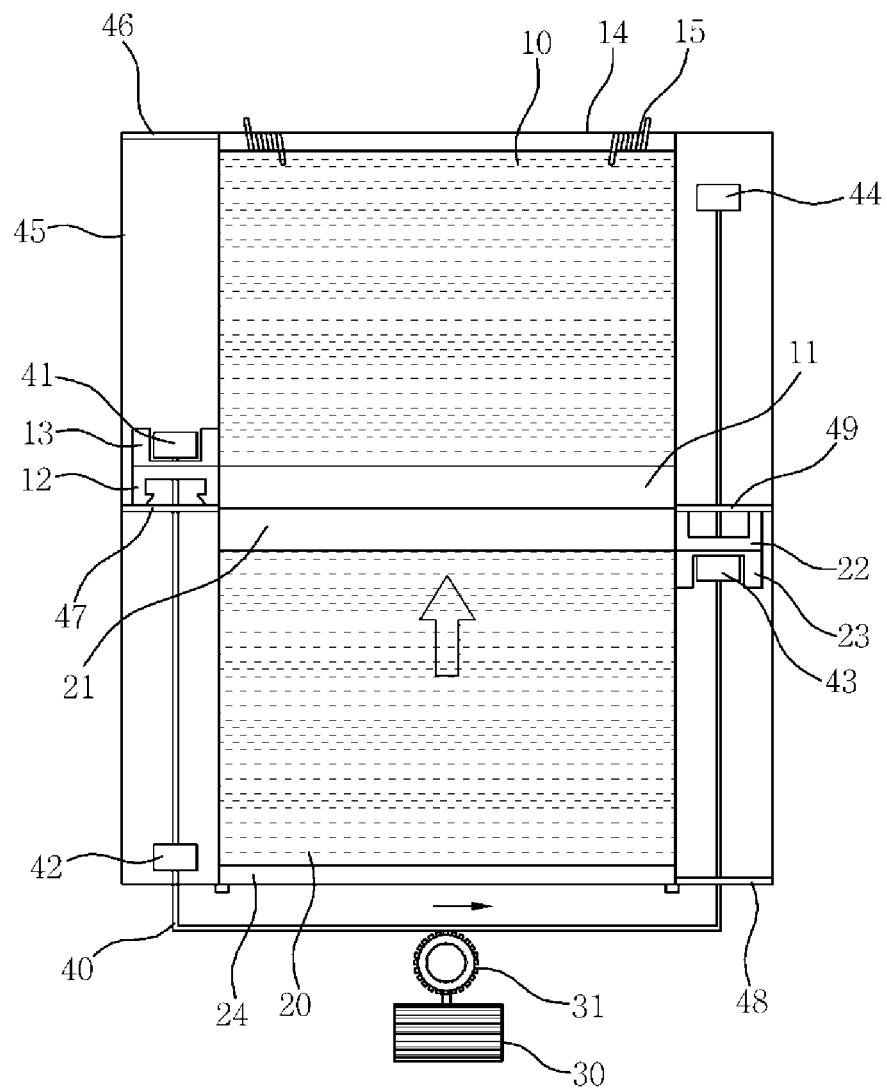
FIG. 4D illustrates an operational state of the roll blind system of FIG. 1 in a full closed mode.
Figure 5:
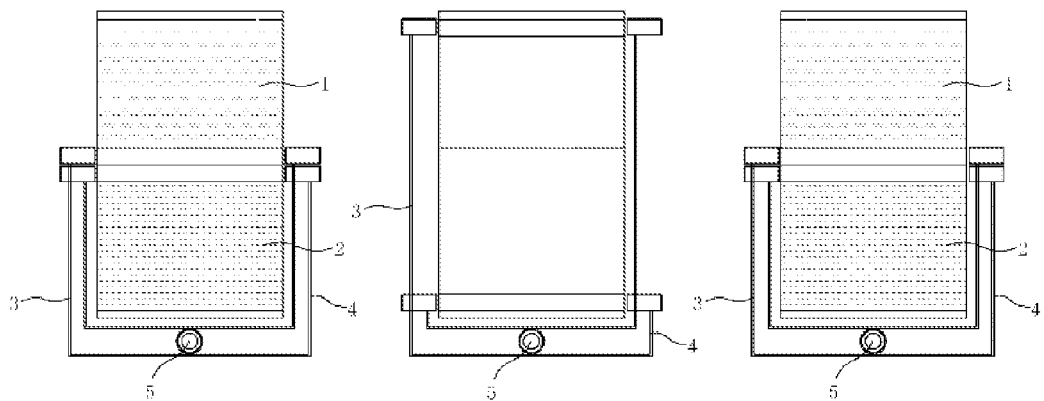
FIG. 5 is a schematic view illustrating a roll blind system for a panorama sun roof according to the related art.

Lastly, as illustrated in FIG. 4D, if the motor 30 is driven according to a full closed signal so as to implement an initial full closed mode, the cable 40 is moved in one direction, and the second cable end 42 is separated from the front shoe 12 and is moved in the backward direction, and the front shoe 12 is blocked by the second stopper 47 and is not movable in the backward direction, and the first cable end 41 pushes (pulls) the front carrier 13 and is moved in the backward direction to the front shoe 12 and is stopped at the front shoe 12.

In this case, the third cable end 43 pulls the rear carrier 23 and the rear shoe 22 and is moved in the forward direction and simultaneously pulls the rear blind bar 21 connected to the rear shoe 22 so as to close the rear roll blind 20.

The open and/or closed mode of the roll blind system described above may be implemented by changing and controlling an open and/or closed mode of the roll blind by operating a switch disposed in the vehicle, for example.

In this way, in a roll blind system for a panorama sun roof of a vehicle according to the present invention, front and rear roll blinds are independently open and operate sequentially, thereby providing various open and/or closed modes, such as a front open mode and a rear open mode in which the front roll blind and the rear roll blind are independently open, in addition to a full open mode and a full closed mode. Thus, both front seat and rear seat passengers may be comfortable.

As described above, in a roll blind system for a panorama sun roof of a vehicle according to the present invention, only the front or rear roll blind may be independently open so that user's convenience may be increased, and since one motor is used, the roll blind system is advantageous to a package and the effect of cost reduction may be achieved.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roll blind system for a panorama sun roof of a vehicle, the roll blind system comprising:
    a front roll blind and a rear roll blind disposed between right and left guide rails, disposed in front of and in rear of the panorama sun roof to be open or closed and including a front blind bar and a rear blind bar disposed on opposite ends of the front roll blind and the rear roll blind;
    one cable engaged with a motor gear and being movable in forward and backward directions by a motor;
    a front shoe attached to a left end of the front blind bar and movable in the backward direction via the cable and a second cable end;
    a rear shoe attached to a right end of the rear blind bar and movable in forward and backward directions via the cable and third and fourth cable ends; and
    a return spring connected to a front blind shaft to be extendable when the front blind bar is moved in the forward direction.

2. The roll blind system of claim 1, wherein a first stopper and a second stopper are disposed on a front end and a middle part of one side guide rail, and a third stopper and a fourth stopper are disposed on a rear end and a middle part of the other side guide rail.

3. The roll blind system of claim 1, wherein the front shoe comprises a protrusion by which the second cable end moved in the forward direction together with the cable, is caught.

4. The roll blind system of claim 1, wherein the cable comprises:
    a first cable end disposed in front of the front shoe;
    a fourth cable end disposed in front of the rear shoe; and
    a second cable end and a third cable end, each spaced apart from the first cable end and the fourth cable end by a predetermined distance and being movable together with the cable by using a motor.

5. The roll blind system of claim 1, wherein a front carrier is disposed in front of the second cable end in a state where the front shoe is interposed between the front carrier and the second cable end, and a rear carrier is disposed in front of the third cable end in a state where the rear shoe is interposed between the rear carrier and the fourth cable end.

* * * * *